Jan. 4, 1927.

C. MACBETH

1,613,519

MACHINE FOR MAKING PNEUMATIC TIRE COVERS AND CASINGS

Filed Dec. 31, 1921 5 Sheets-Sheet 1

Jan. 4, 1927. 1,613,519
C. MACBETH
MACHINE FOR MAKING PNEUMATIC TIRE COVERS AND CASINGS
Filed Dec. 31, 1921 5 Sheets-Sheet 4

Jan. 4, 1927.  1,613,519
C. MACBETH
MACHINE FOR MAKING PNEUMATIC TIRE COVERS AND CASINGS
Filed Dec. 31, 1921  5 Sheets-Sheet 5

Fig.21.

Patented Jan. 4, 1927.

1,613,519

UNITED STATES PATENT OFFICE.

COLIN MACBETH, OF ERDINGTON, BIRMINGHAM, ENGLAND, ASSIGNOR TO THE DUNLOP RUBBER COMPANY, LIMITED, OF REGENTS PARK, LONDON, ENGLAND, A BRITISH COMPANY.

MACHINE FOR MAKING PNEUMATIC TIRE COVERS AND CASINGS.

Application filed December 31, 1921, Serial No. 526,091, and in Great Britain February 3, 1921.

This invention relates to machines for making pneumatic tire covers or casings (which machines are generally known as case making machines) and has particular reference to such machines of the kind in which the casing plies are laid or rolled down on the sides of the core by means of spinning down discs or the like which are moved inwardly towards the core centre during the rotation of the core. The results obtained by the spinning down discs are dependent amongst other factors on the angle at which the discs move in relation to the contour of the core and it is customary to control the angularity of the discs either by hand or by suitable cam arrangements, the latter having to be changed for each size of tire casing to be built up.

According to this invention means are provided whereby the core or casing contour directly controls the angularity of the spinning down discs during the inward or operative stroke of the latter. For this purpose each spinning down disc may be supported in such manner as to be capable of swivelling movement and it is provided or associated with a member in contact with the core or the casing plies thereon so that a two-point contact is obtained which enables the spinning down disc to swivel and thus change its angular position relatively to the contour of the core or casing plies. The said member by means of which a two-point contact with the core is obtained may be in the form of an additional disc which may serve by reason of its contact with the rotating core or the ply thereon to drive or rotate the spinning down disc, and means may be provided for enabling each spinning down disc to be rotated at a peripheral speed which is variable as required relatively to the peripheral speed of that portion of the casing ply with which the said disc makes contact. Each spinning down disc and its additional or driving disc may revolve on a common axis or on separate axes and can be either rigidly connected or geared together so that they have a fixed velocity ratio; alternatively the driving disc may drive the spinning down disc through suitable friction means so that the velocity ratio may vary in such manner that the outer or driving disc (which has a good grip on the core and the casing ply) efficiently controls the speed of the spinning down disc. In some cases the spinning down disc may be of substantially larger diameter than the driving disc in order that the latter having a good grip on the casing will tend to drive the spinning down disc at a higher speed than that of the surface with which the spinning down disc contacts so that a "forward wipe" is imparted to the spinning down discs without causing undue and harmful slipping which on large casings would be injurious. The driving of the spinning down disc at a higher speed than the core by making the spinning down disc of larger diameter than the driving disc or by the gear drive hereinbefore referred to, counteracts any tendency for the plies to fold back or lag and take up an unnatural angle on the core, so that more accurate laying of the plies is ensured. If, however, the spinning down disc is only driven at the same surface speed as the core, it is found that, owing to the driving disc having a firm foundation with which to contact, the lag is reduced because the spinning down disc is only required to attach the ply and does not have to be driven by contact with an unattached ply which tends to an irregular attachment and drag.

Means may be provided for readily adjusting the spinning down discs so that they can be initially presented to the casing at the most desirable angle, for example by varying the distance between the axes of the driving disc and the spinning down disc, or by varying the distance between the planes of these two discs. Thus the improved mechanism may be rendered suitable for dealing with different types and sizes of casings; further the discs may be adjusted to ensure correct distribution of pressure or load thereon at different points on the core contour.

If desired means may be provided for causing a jet of air to impinge on the portion of the ply radially in advance of the spinning down disc for the purpose of preventing this portion of the ply from folding back or being creased during the spinning or rolling down stroke. Alternatively, a metal shield or wiper plate may be associated with the spinning down disc in such manner that it engages with the ply and prevents the latter from being folded back or creased.

In order that the said invention may be clearly understood and readily carried into effect, the same will now be described more fully with reference to the accompanying drawings, in which—

Figures 1 and 2 are respectively a sectional elevation and a plan view showing one construction of the improved spinning down mechanism located at one side of the tire core.

Figures 3 and 4 are enlarged sectional detail views hereinafter referred to.

Figure 11 is a sectional plan of a modification similar to that shown in Figures 9 and 10.

Figure 12 is a detail view hereinafter referred to.

Figures 16, 17 and 18 are diagrams hereinafter referred to.

The examples illustrated in the drawings show the spinning down mechanism at only one side of the core; it will be understood however that various examples shown in the accompanying drawings are duplicated and placed one on each side of the rotating core. Throughout the aforesaid drawings Z represents the rotatable tire core on which the casing is built up and in certain of the figures Z' represents the casing or casing plies placed around the core; A represents the inner or spinning down disc and B represents the controlling or driving disc.

Figures 1, 2, 3, 4:
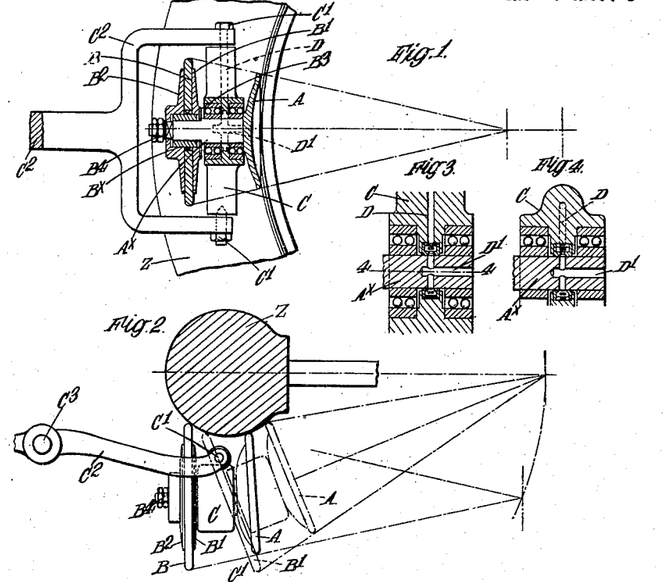

In the example shown in Figure 1 the spinning down disc A is connected to or forms part of one end of a shaft $A^x$ whose other end loosely carries a bush $B^x$ on which the disc B is rigidly secured. The disc B is clamped between friction plates B' and $B^2$ by means of a spring washer $B^3$ and lock nuts $B^4$, which latter secure the friction plate $B^2$ on the outer end of the shaft $A^x$, the said shaft $A^x$ is supported in a yoke C by ball bearings or the like, which yoke is mounted to swivel on pins C' in a forked arm or lever $C^2$ pivoted at $C^3$ (see Figure 2) on a reciprocatory slide adapted to impart the required radial movement to the spinning down discs A and the driving discs B at the two sides of the core; the discs A and B are adapted to be maintained in contact with the core Z or the casing plies Z' thereon by suitable pressure means such as hereinafter described or as described in the specification of our concurrent application No. 527,160, filed January 5, 1922, Pat. No. 1,565,176, Dec. 8, 1925. Owing to the two discs A and B being pressed against the sides of the core, the yoke C swivels on the pins C' during the forward or operative stroke so that the two discs are angularly moved on the axis of movement of the said yoke by reason of their engagement with the core Z (or the casing plies Z') which therefore serves as a cam to control the angular movement of the said discs A and B during the spinning down stroke. It will be understood that the driving disc B is rotated by reason of its contact with the rotating core and therefore imparts rotation to the spinning down disc A through the friction plates $B^2$ and $B^3$ and the shaft $A^x$; by means of this friction drive it is possible to impart the necessary drive and forward wipe to the spinning down disc A without causing excessive and harmful slippage which on large casings would be injurious. An air jet may be provided for impinging on the loose portion of the casing ply in advance of the spinning down disc to prevent this portion of the ply folding back and creasing and in the example shown in Figure 1 the air may be supplied from a suitable source through a flexible pipe, not shown, to a passage D in the aforesaid yoke communicating with a passage D' in the shaft $A^x$ which passage D' terminates at the centre of the spinning down disc so that the jet of air issues from the said centre and is directed on to the loose portion of the ply during the inward or operative stroke. The passages D and D' are shown more clearly in the enlarged sectional view shown in Figure 3 and the sectional plan view shown in Figure 4, the latter sectional view being taken on the line 4—4 of Figure 3.

Figure 5:
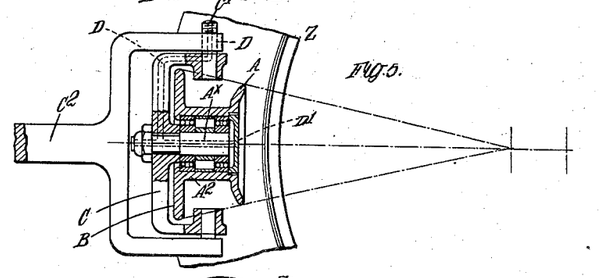
Figures 5 and 6 are respectively a side elevation and a plan of a modified construction of the improved spinning down mechanism.
Figure 6:
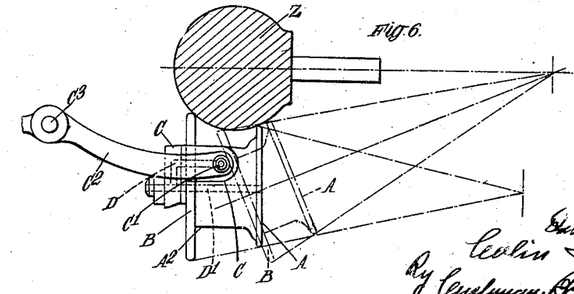

In the example shown in Figures 5 and 6 the spinning down disc A and the driving disc B are rigidly connected for example by an integral sleeve $A^2$ which is adapted to rotate on ball bearings or the like around a shaft $A^x$ which is fixed in a U-shaped bracket or yoke C capable of swivelling on pins C' carried by a forked lever $C^2$ pivotally mounted at $C^3$ on a reciprocatory slide as hereinbefore described in connection with the example shown in Figures 1 and 2. In this example the shaft $A^x$ does not rotate but merely serves as a support for the rigidly connected discs A and B which as aforesaid are maintained in contact with the core so that the contour of the latter causes the discs A and B to move with the swivelling yoke C, thus the angularity of the discs relatively to the core is automatically changed during the spinning down stroke. In this example an air passage D leading from the upper pin C' extends through the yoke C and communicates with a passage D' in the shaft $A^x$, which passage D' terminates at the centre of the spinning down disc A so that air may issue from the said passage D' and impinge on the loose portion of the ply in advance of the spinning down disc.

Figures 7, 8:
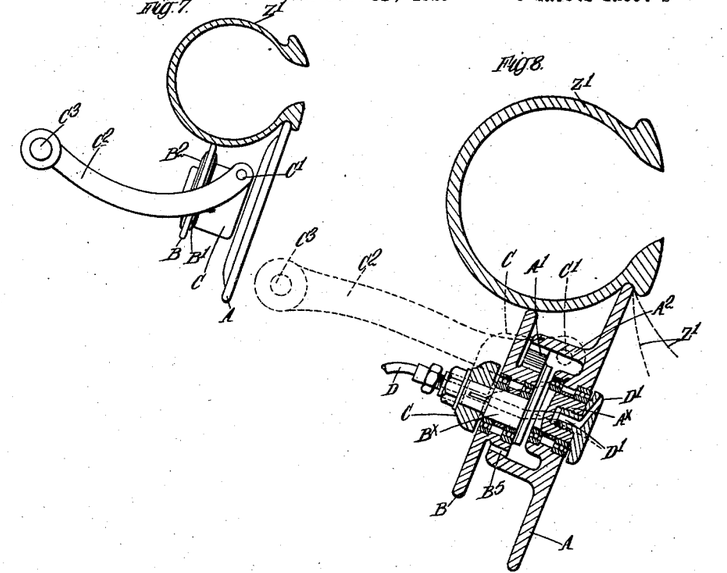
Figure 7 is a plan view of a further modification.
Figure 8 is a sectional plan view of a modification similar to that illustrated in Figure 7.

The example illustrated in Figure 7 is a modification of the construction shown in Figures 1 and 2 and is particularly suitable for rolling down plies over a clincher type of bead. In this example the spinning down disc A is of larger diameter than the driving disc B and owing to the larger diameter of the spinning down disc the latter is caused to be presented to the bead at a more acute angle than in the example hereinbefore described. Also the smaller driving disc B tends to drive the spinning down disc A at a higher speed than that of the surface with which the disc A makes contact. In order to prevent slippage at the point of contact between the large diameter spinning down disc and the ply as may occur if the two discs were frictionally connected as described in connection with the example illustrated in Figures 1 and 2, it is preferred to positively gear the two discs A and B together so that they have a fixed velocity ratio. Figure 8 illustrates an example in which the two discs A and B are positively geared together; the two discs A and B are rotatably mounted preferably on ball bearings or the like on an eccentric shaft (that is, a shaft having two portions $A^x$ $B^x$ which are not axial in alignment), the said eccentric shaft in the example shown being rigidly fixed in a U-shaped bracket or yoke C capable of swivelling in a forked lever $C^2$, as described in connection with the example shown in Figures 5 and 6. The disc B is formed or provided with a toothed boss or pinion $B^5$ in mesh with an internal toothed ring A' formed on a boss $A^2$ extending rearwardly from the spinning down disc. The gear ratio is so arranged that whilst the diameters of the discs B and C are such as to cause the spinning down disc to be presented to the bead at the most favourable angle the spinning down disc is prevented from slippage relatively to the ply at the point of contact. If desired the driving disc B may be provided with frictional gripping means as described in connection with the example shown in Figures 1 and 2. The portions $A^x$ and $B^x$ of the aforesaid eccentric shaft may be parallel or inclined to suit the relative angle required by each disc. Instead of employing a one piece eccentric shaft the bearing portions $A^x$ $B^x$ may be separate and suitably supported in the swivelling frame or yoke C. Air may be supplied through a pipe D and a passage D' in the eccentric shaft terminating in a nozzle directed inwardly towards the loose portion of the ply indicated by the dotted lines Z' in Figure 8 in advance of the spinning down disc.

Figure 9:
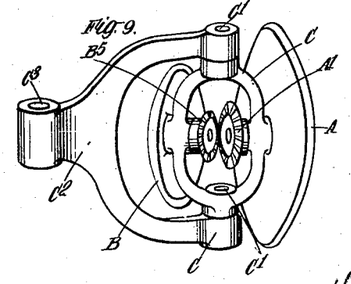
Figures 9 and 10 are respectively a side elevation and a sectional plan of a still further modification.
Figure 10:
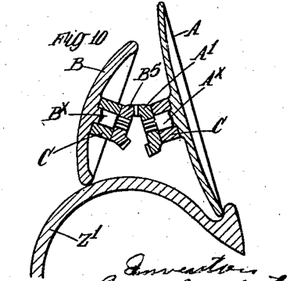
Figures 11, 12:
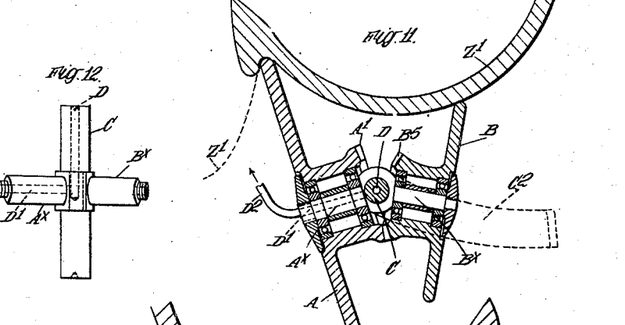

The example illustrated in Figures 9 and 10 possesses the same advantages as the construction shown in Figure 8. In this example, however, the spinning down disc A and the driving disc B are mounted on shaft $A^x$ $B^x$ having intersecting axes, which shafts are supported in a frame or yoke C adapted to swivel on pins C' in a forked lever $C^2$ as hereinbefore described. The shafts $B^x$ and $A^x$ are geared together by bevel pinions $B^5$ and A' having the desired ratio. Figure 11 illustrates a similar modification to that shown in Figures 9 and 10 wherein the bevel pinions $B^5$ and A' are formed at the ends of bosses on the discs A and B rotatably mounted on the inclined shafts $A^x$ $B^x$ which extend from a vertical rod C (see Figure 12) adapted to swivel in a forked lever $C^2$ for enabling the angularity of the discs to be changed during the operative stroke. Air may be passed through a passage D in the rod C to a passage D' in the shaft $A^x$ connected to an inwardly directed nozzle or jet tube $D^2$ so that the issuing air impinges on the loose portion of the ply Z' in advance of the spinning down disc as indicated in Figure 11.

Figure 13:
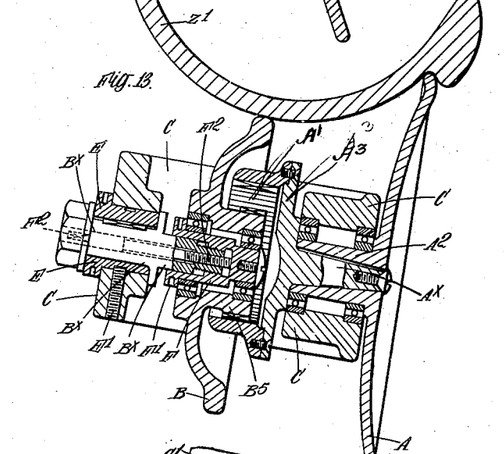
Figures 13, 14 and 15 are sectional plan views of further modifications.
Figures 14, 15:
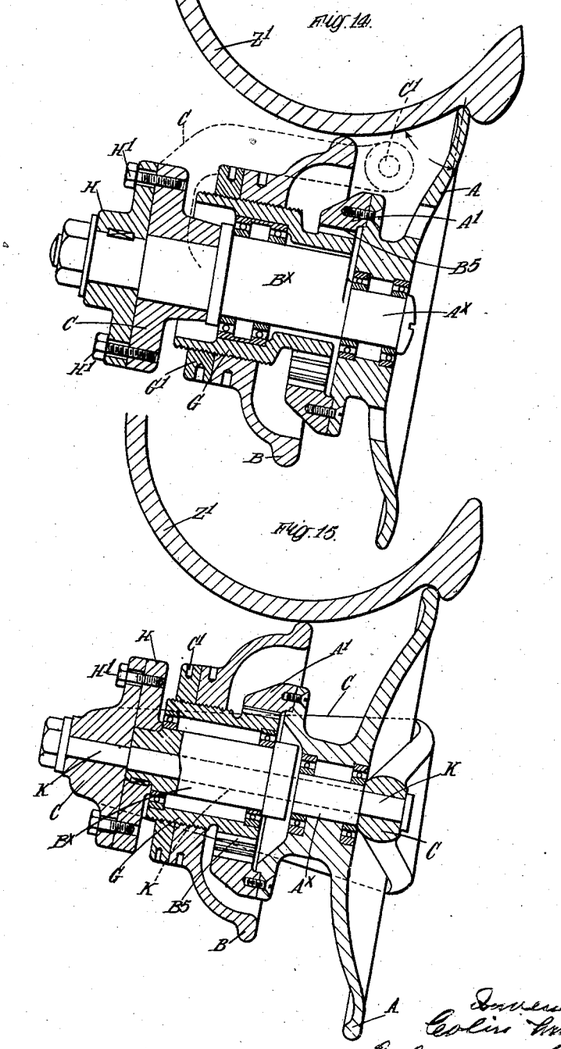
Figure 16:
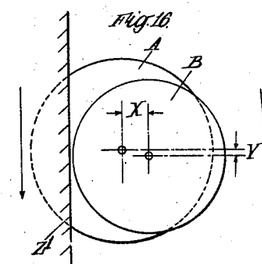
Figure 17:
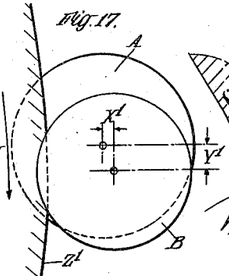
Figure 18:
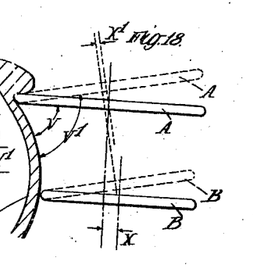

Figures 13, 14 and 15 show examples which are generally similar to that shown in Figure 8 but they are provided with means for initially adjusting or setting the angle of the spinning down disc so that the latter may be presented to the casing plies on the core at the most favourable angle, thus rendering the spinning down mechanism suitable for dealing with large variations in sizes of casings. Before describing these modifications in detail the one method of adjusting the discs will be described with reference to the modification shown in Figure 8 and the diagrams shown in Figures 16, 17 and 18 considering the construction shown in Figure 8, it will be understood that if the eccentric shaft $A^x$ $B^x$ be angularly moved in relation to its bearing or yoke C the positions of the discs A and B would be altered in relation to the casing Z'. This will be better understood by reference to the diagrams illustrated in Figures 16, 17 and 18. In Figure 16 which is an end view looking towards the centres of the discs the horizontal distance between the centres of the discs is indicated by X and the vertical distance between the said centres by Y. By angularly moving the eccentric shaft $A^\times B^\times$ (see Figure 8) in its yoke or bearing C in a clockwise direction, the relative positions of the discs is changed so that as shown in Figure 17 the horizontal distance between the disc centres is substantially reduced as indicated by X' and the vertical distance between the said centres increased as indicated by Y'. By reason of the contact of the discs A and B with the casing Z' and the swivelling yoke C (see Figure 8) the aforesaid angular adjustment of the eccentric shaft $A^\times$, $B^\times$ and the consequent variation of the position of the discs A and B result in the angular positions of the said discs being changed relatively to the casing Z' as shown in dotted lines in the plan view illustrated in Figure 18. The discs A and B as indicated in full lines in Figure 18 correspond with the position of the discs shown in Figure 16 whilst the dotted position of the discs in Figure 18 corresponds to the position of the discs in Figure 17 and the variation in the horizontal distances between the disc centres is shown by X and X'. It will therefore be understood that the effect of reducing the horizontal distance between the disc centres from X to X' is to increase the angle between the disc A and the casing Z' from V to V' see Figure 18. The constructions shown in Figures 13, 14 and 15 are as aforesaid generally similar to that illustrated in Figure 8 and show different ways in which the adjustment above described can be obtained. These examples also comprise means for adjusting the distance between the planes of the discs A and B this adjustment also enabling the two discs to be initially set at the most favourable angle relatively to the core or casing.

In the example shown in Figure 13 the spinning down disc A and the driving disc B are mounted on independent shafts $A^\times B^\times$, the shaft $A^\times$ being on a stationary axis relatively to the supporting bracket or yoke C, whilst the shaft $B^\times$ is mounted in a rotatable eccentric bush E which is fitted in the yoke or swivelling frame C and has its axis of rotation in alignment with the axis of the shaft $A^\times$. The shaft $A^\times$ which is fitted in a boss $A^2$ on the disc A is formed with a flange $A^3$ to which is secured an internally toothed ring A' and the driving disc B is formed with a toothed boss or pinion $B^5$ which is maintained in proper mesh with the internally toothed ring A' for all adjustments by reason of the axis of the bush E being in alignment with the axis of the shaft $A^\times$. Therefore by angularly moving the bush E (for which purpose it may be provided with a flange having tommy holes) the position of the driving disc B relatively to the spinning down disc is altered so as to vary the horizontal distance between the centres of the discs as hereinbefore described with reference to the diagrams in Figures 16, 17 and 18. A set screw E' in the yoke C is provided for clamping or locking the bush E in any position to which it is adjusted. The driving disc B with its toothed boss or pinion $B^5$ is mounted on ball bearings on a bush F fitted on the shaft $B^\times$ and internally threaded to engage with a threaded end of the said shaft $B^\times$ the bush F has a flange with tommy holes F' for enabling it to be moved along the shaft $B^\times$ carrying with it the driving disc B and the pinion $B^5$, the teeth of the internally toothed ring A' being sufficiently wide to permit of this axial movement of the driving disc B and its pinion $B^5$ relatively to the spinning down disc A. The driving disc B may be locked in the desired position by means of a screw $F^2$ disposed in the bore of the shaft $B^\times$ and threaded in the end of the latter so that it can be screwed against the end of the bush F, as shown in Figure 13.

In the example shown in Figure 14 a one piece eccentric shaft is employed, one portion $A^\times$ of this shaft carrying the spinning down disc A whilst the portion $B^\times$ of the said eccentric shaft supports an externally threaded bush G on which the driving disc B is screwed and locked thereon by a lock nut G' provided with tommy holes. The pinion $B^5$ is keyed on a reduced end of the bush G so as to mesh with the internally toothed ring A' which in this example is a flanged boss secured on the spinning down disc A. The aforesaid eccentric shaft $A^\times B^\times$ is rotatably supported in the yoke or bearing C, the portion of the shaft fitted in said yoke preferably having its axis disposed equidistant between the axes of the pinion $B^5$ and the internally toothed ring A'. The outer end of the eccentric shaft has keyed thereon a flange H which can be angularly moved to partially rotate the eccentric shaft $A^\times B^\times$ in its bearing or yoke C in order to vary the horizontal distance between the centres of the two discs A and B and thus enable the angle of the spinning down disc relatively to the casing to be changed as hereinbefore described with reference to Figures 16, 17 and 18. The flange H and the eccentric shaft may be locked in any desired position by means of screws H' engaging with the yoke or bearing C. The distance between the planes of the discs A and B can be altered by screwing the disc B to the desired position on the bush G without moving the pinion B⁵.

In the example shown in Figure 15 the eccentric shaft having the portions Aˣ and Bˣ pertaining to the spinning down disc A and the driving disc B respectively, is rotatably mounted on a spindle K whose ends are supported in the bracket C which is suitably mounted to serve as the swivelling yoke described in the foregoing modifications. The outer end of the eccentric shaft has keyed thereon a flange H which can be adjusted to angularly move the eccentric shaft and vary the horizontal distance between the centres of the discs A and B as described in connection with the diagrams shown in Figures 16, 17 and 18. The flange H is adapted to be secured to suitable portions on the yoke or bracket C by set screws H' in order to set the eccentric shaft, the spinning down disc A and the driving disc B in the required positions. As in the example shown in Figure 14 the driving disc B is screwed on to an externally threaded bush G supported on the portion Bˣ of the eccentric shaft and provided with the pinion B⁵ in mesh with the internally toothed ring A' carried on a flanged extension or boss of the spinning down disc A, so that the driving disc B can be moved to vary the distance between the planes of the two discs A and B as hereinbefore described. Instead of providing a spindle passing through the eccentric shaft as shown in Figure 15 the eccentric shaft may be formed with suitable ends fitting in bearings in the yoke or bracket C in such manner as to enable the eccentric shaft to be adjusted to vary the horizontal distance between the centres of the two discs A and B. As hereinbefore described the adjustment of the eccentric shaft for varying the horizontal distance between the centres of the two discs A and B and changing the angularity of these discs relatively to the casing, results in the vertical distance Y (see Figures 16 and 17) being altered. In most cases this alteration in the vertical distance between the two centres would not be a disadvantage but if desired it may be avoided by suitably tilting the eccentric shaft so that the distance Y' (see Figure 17) can be reduced. This tilting movement may be effected by providing means for adjusting the support carrying the pin C³ on which the forked arm C² carrying the yoke C is mounted; this adjustment may be effected by mounting the top portion of the reciprocating slide on a suitable hinge and providing means for clamping the same in any desired position so that the whole spinning down mechanism can be located as required.

Various means for obtaining or effecting the change in the angularity of the discs relatively to the casing may be employed and the arrangements of the discs not employing a gear drive may also be made capable of adjustment to vary the horizontal distance between the centres of the discs and also to enable the distance between the planes of the discs to be varied as required so that the discs may be set in the most favourable angular or other positions relatively to the core to suit different types or sizes of casings to be built up.

After the discs A and B have been adjusted as required the angularity thereof is controlled during the operative stroke by the core or casing serving as a cam and causing the yoke or frame C to partake of its swivelling movement so that the angular position of the discs changes as they move along the casing at the sides of the core.

Any suitable means for causing the air to impinge on the ply in advance of the spinning down disc may be provided in connection with any of the examples hereinbefore described for instance in some cases a separate pipe may be hinged on the axis of the swivelling yoke C around which axis, the two discs are angularly moved due to the contour of the core, the said pipe being bent round outside the spinning down disc with its nozzle suitably inclined to direct the air on to the loose portion of the ply in advance of the said disc.

Figure 19:
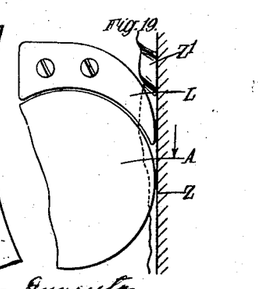
Figure 19 is a front view of one of the spinning down discs with which is associated the aforesaid metal shield or wiper plate.
Figure 20:
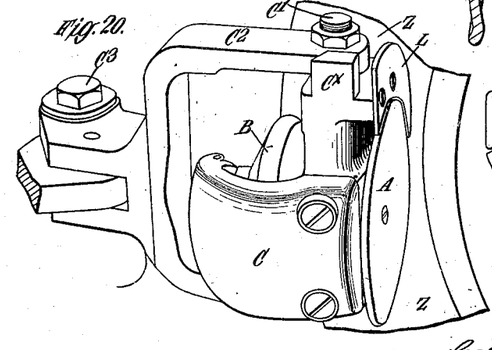
Figure 20 is a diagrammatic perspective view showing the metal shield or wiper plate mounted on a swivelling yoke or frame which carries the spinning down disc and the driving disc.

Instead of employing a jet of air for preventing folding back or creasing of the plies a metal shield or wiper plate L (see Figures 19 and 20) may be mounted on the swivelling yoke or frame C in a position above the spinning down disc and preferably in the plane of the said disc, the inner end of the said plate being suitably curved to form a bearing surface which may engage with the ply on the rotating core prior to the spinning down disc making contact with the ply. Owing to the wiper plate L being carried by the swivelling yoke or frame C it partakes of the angular movement which is imparted to the spinning down disc. Figure 20 shows a stop Cˣ on the swivelling yoke C which stop is adapted to come into contact with the forked arm C² when the spinning down disc A initially engages with the core, so as to prevent the yoke from moving too far towards the core prior to the driving disc B coming into contact with the core. After the spinning down disc has been slightly moved forward in commencing the operative stroke the driving disc B comes into contact with the core thus providing the "two point contact" which enables the swivelling yoke C and the two discs A and B to partake of the angular movement determined by the contour of the core or the casing thereon.

Figure 21:
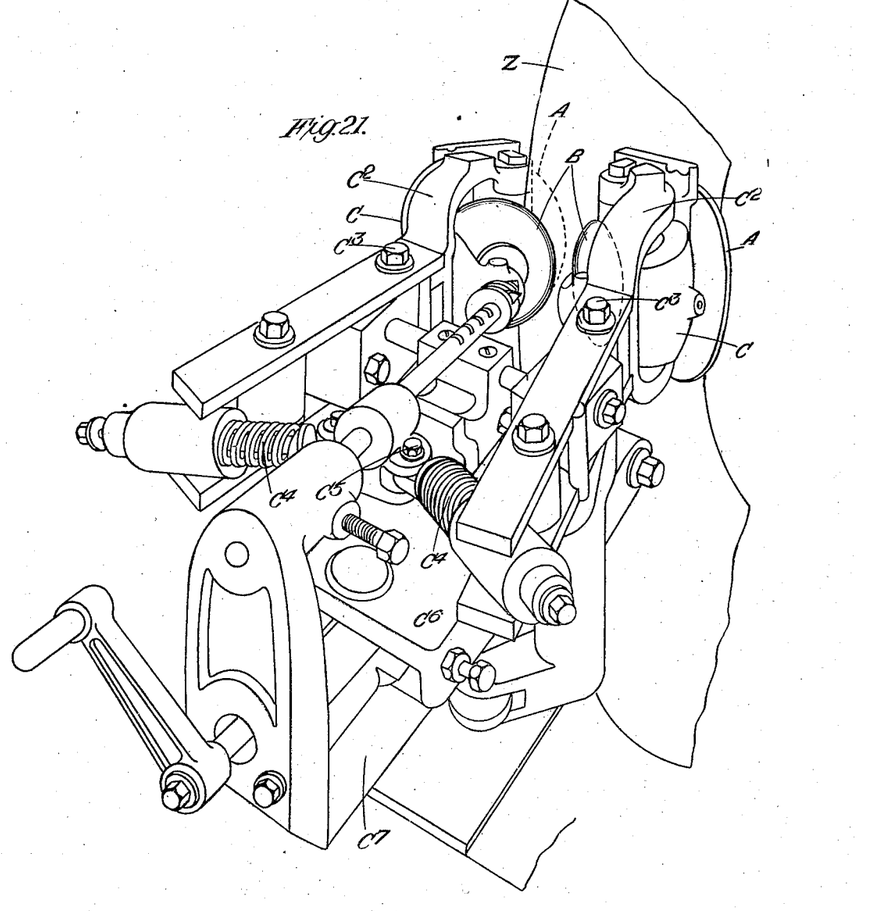
Figure 21 is a diagrammatic perspective view illustrating the two discs on each side of the core with suitable means for maintaining discs in contact with the core and the reciprocating slide or carriage on which the discs are mounted.

The particular arrangement for supporting the discs and maintaining each pair of discs in contact with the core may vary according to the construction of each pair of discs, and in the example illustrated in Figure 21 each pair of discs A and B at each side of the core is arranged in a yoke C to swivel in a bracket $c^2$ or forked lever $C^2$ as hereinbefore referred to, which brackets or levers $C^2$ are pivotally mounted at $C^3$ and extended beyond their pivots so as to be engaged by or under the influence of compression springs $C^4$ suitably connected to the extensions of the brackets $c^2$ and to fixed parts or pivots $C^5$ on the reciprocating slide or carriage $C^6$ which is adapted to be moved towards and away from the centre of the core $z$ on a frame or guide $C^7$. The compression springs connected to the extensions of the brackets $C^2$ forces these extensions outwardly so that the forked portions on the other sides of the pivots $C^3$ are moved towards each other thus maintaining each pair of discs in contact with the core so as to provide the two point contact at each side of the core during the working stroke.

What I claim and desire to secure by Letters Patent of the United States is:—

1. In a tire making machine, the combination of a core on which the tire casing is built up, spinning down members, means for moving said members inwardly towards the centre of the core in contact with the casing plies at the sides of the core, guiding means whereby the surface or contour of the casing plies on the core is enabled to cause the spinning down members to change their angularity during the inward movement of the said members, and means whereby the said guiding means positively rotate the spinning down members during their said inward movement.

2. In a tire making machine, the combination of a core on which the tire casing is built up, spinning down members, means for moving said members inwardly towards the centre of the core in contact with the casing plies at the sides of the core, means adapted to drive said members and bearing on the said casing plies so as to afford a two-point contact at each side of the core, and means whereby the two-point contact enables the angularity of the spinning down members to be varied during the said inward movement.

3. In a tire making machine, the combination of a core on which the tire casing is built up, spinning down discs, means for moving said discs inwardly towards the centre of the core in contact with the casing plies at the sides of the core, an additional disc connected to and adapted to positively rotate each spinning down disc and bearing on said casing plies, and means whereby each spinning down disc with its additional disc can swivel during the inward movement of the discs so that during this movement the curved surface or contour at the sides of the core causes the spinning down discs to change their angularity with respect to the core while they are being rotated by said driving discs.

4. Spinning down mechanism for tire making machines, comprising a reciprocatory carriage, arms pivoted thereon, spinning down discs carried by said arms, an additional disc positively connected to and adapted to rotate each spinning down disc, a swivel mounting for each spinning down disc and its additional disc, and means acting on said arms to maintain each spinning down disc and its additional disc in contact with the sides of the core on which the tire casing is built up so that a two-point contact is provided at each side of the core for enabling the spinning down discs to swivel and change their angularity with respect to the core.

5. Spinning down mechanism for tire making machines, comprising a reciprocating carriage, arms pivoted thereon, spinning down discs carried by said arms, driving discs connected to the spinning down discs, means whereby the driving discs positively rotate the spinning down discs during the inward movement, means acting on said arms to maintain the discs in contact with the core on which the tire casing is built up, and means whereby the surface or contour at the sides of the core acts as a cam for controlling the angularity of the discs during the inward movement.

6. Spinning down mechanism for tire making machines, comprising a reciprocatory carriage, arms pivoted thereon, frames mounted to swivel on said arms, spinning down discs carried in said frames, a driving disc connected to each spinning down disc and carried by said frame, and means whereby said discs are maintained in contact with the core on which the tire casing is built up, so that the two-point contact afforded by each spinning down disc and its driving disc enables the core to cause said frames to swivel and change the angularity of said discs with respect to the core during the inward movement.

7. Spinning down mechanism for tire making machines, comprising a reciprocatory carriage, arms pivoted thereon, spinning down discs carried by said arms, a driving disc connected to and adapted to rotate each spinning down disc, a swivel mounting for each spinning down disc and its driving disc, means acting on said arms for maintaining the discs in contact with the sides of the core on which the tire casing is built up, and means whereby each spinning down disc is rotated at a peripheral speed which is variable as required relatively to the peripheral speed of the portion of the casing ply with which the disc makes contact.

8. Spinning down mechanism for tire making machines, comprising a reciprocatory carriage, arms pivoted thereon, spinning down discs carried on said arms, an additional disc associated with each spinning down disc, a swivel mounting for each spinning down disc and its additional disc, means acting on said arms for maintaining all the discs in contact with the sides of the core on which the tire casing is built up, and a geared connection between each additional disc and the associated driving disc.

9. Spinning down mechanism for tire making machines, comprising a reciprocatory carriage, arms pivoted thereon, a frame mounted to swivel in each arm, a spinning down disc rotatably mounted in each frame, a driving disc on each frame for rotating each spinning down disc, said driving discs being of smaller diameter than the spinning down discs, and means acting on both discs for maintaining them in contact with the sides of the core on which the tire casing is built up during the inward movement of the discs.

10. Spinning down mechanism for tire making machines, comprising a reciprocatory carriage, arms pivoted thereon, spinning down discs carried by said arms, a driving disc for rotating each spinning down disc, a swivel mounting for each spinning down disc and its driving disc, means acting on said arms for maintaining all the discs in contact with the sides of the core on which the tire casing is built up, and means for adjusting the positions of the spinning down discs in relation to their driving discs so that they can be presented to the casing at the most desirable angle which during the inward movement is controlled by the surface or contour at the sides of the core.

11. Spinning down mechanism for tire making machines, comprising a reciprocatory carriage, arms pivoted thereon, spinning down discs carried by said arms, a driving disc for positively rotating each spinning down disc, means for maintaining the discs in contact with the sides of the core on which the tire casing is built up, a swivel mounting for each spinning down disc and its driving disc, and means for varying the distance between the axes of each spinning down disc and its driving disc.

12. Spinning down mechanism for tire making machines, comprising a reciprocatory carriage, arms pivoted thereon, spinning down discs carried by said arms, a driving disc for positively rotating each spinning down disc, means for maintaining the discs in contact with the sides of the core on which the tire casing is built up, a swivel mounting for each spinning down disc and its driving disc, and means for varying the distance between the planes of the spinning down disc and its driving disc.

13. Spinning down mechanism for tire making machines, comprising a reciprocatory carriage, arms pivoted thereon, frames mounted to swivel in said arms, a spinning down disc mounted in each frame a driving disc for each spinning down disc, gearing between said driving disc and said spinning down disc, means for maintaining the geared discs in contact with the sides of the core on which the tire casing is built up, so that during the inward movement of the discs the surface or contour at the side of the core acts as a cam for controlling the angularity of the discs, and means for adjusting the relative positions of said spinning down disc and its driving disc.

14. Spinning down mechanism for tire making machines, comprising a reciprocatory carriage, arms pivoted thereon, spinning down discs carried by said arms, a driving disc for each spinning down disc, a swivel mounting for supporting each spinning down disc and its driving disc on said arms, a gear wheel on each spinning down disc, a pinion on each driving disc in mesh with said gear wheel, and means for acting on said arms for maintaining the discs in contact with the sides of the core on which the tire casing is built up.

15. Spinning down mechanism for tire making machines, comprising a reciprocatory carriage, arms pivoted thereon, frames mounted to swivel in said arms, spinning down discs mounted in said frames, and each provided with a toothed ring, driving discs mounted in said frames and having gear wheels meshing with said toothed rings on said spinning down discs, means whereby the positions of the axis of each driving disc may be varied in relation to the axis of the spinning down disc, and means acting on said arms for maintaining the discs in contact with the sides of the core on which the tire casing is built up.

16. Spinning down mechanism for tire making machines, comprising a reciprocatory carriage, arms pivoted thereon, frames mounted to swivel in said arms, spinning down discs mounted in said frames and each provided with a toothed ring, driving discs mounted in said frames and having gear wheels meshing with the toothed rings on said spinning down discs, means whereby the position of the axis of the driving disc may be varied in relation to the axis of the associated spinning down disc, means acting on said arms for maintaining the discs in contact with the sides of the core on which the tire casing is built up, and means whereby the distance between the planes of the discs can be varied.

17. Spinning down mechanism for tire making machines, comprising a reciprocatory carriage, arms pivoted thereon, frames mounted to swivel on said arms, supporting means in each frame carrying a spinning down disc and a driving disc, an internally toothed ring on each spinning down disc, a pinion associated with each driving disc in mesh with the toothed ring thereof, means for varying the distance between the axes of the said associated discs, and means whereby the driving discs may be axially moved in relation to said spinning down discs.

18. Spinning down mechanism for tire making machines, comprising a reciprocatory carriage, arms pivoted thereon, frames mounted to swivel in said arms, relatively adjustable eccentric shafts supported in each frame and carrying a driving disc and a spinning down disc, whereby the distance between the axes of the two discs can be varied, an internally toothed ring on each spinning down disc, a pinion connected with the associated driving disc and meshing with said toothed ring, means for varying the distance between the axes of the said discs, and means whereby the driving discs may be axially moved in relation to said spinning down discs.

19. Spinning down mechanism for tire making machines, comprising a reciprocatory carriage, arms pivoted thereon, frames mounted to swivel in said arms, a spinning down disc mounted in each frame, a second disc mounted in each frame and adapted to drive the adjacent spinning down disc, means for maintaining the discs in contact with the sides of the core on which a tire casing is built up, and means for limiting the swivelling movement of said frames.

20. Spinning down mechanism for case making machines in which each spinning down disc is provided with a toothed ring with which a pinion carried by a second or driving disc engages, the two discs being supported in a swivelling frame, substantially as and for the purpose specified.

COLIN MACBETH.